(12) United States Patent
Lescoche et al.

(10) Patent No.: US 11,413,562 B2
(45) Date of Patent: Aug. 16, 2022

(54) SEPARATION ELEMENT WITH A THREE-DIMENSIONAL CIRCULATION MATRIX FOR THE FLUID MEDIUM TO BE TREATED

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

(*) Notice: Subject to any disclaimer, the term of this patent is extended or adjusted under 35 U.S.C. 154(b) by 36 days.

(21) Appl. No.: 15/575,899

(22) PCT Filed: May 25, 2016

(86) PCT No.: PCT/FR2016/051233
§ 371 (c)(1),
(2) Date: Nov. 21, 2017

(87) PCT Pub. No.: WO2016/193573
PCT Pub. Date: Dec. 8, 2016

(65) Prior Publication Data
US 2018/0140990 A1 May 24, 2018

(30) Foreign Application Priority Data
May 29, 2015 (FR) .................................... 15 54908

(51) Int. Cl.
*B01D 63/06* (2006.01)
*B01D 69/04* (2006.01)
(Continued)

(52) U.S. Cl.
CPC ..... *B01D 46/2455* (2013.01); *B01D 46/2418* (2013.01); *B01D 46/2451* (2013.01);
(Continued)

(58) Field of Classification Search
CPC ............ B01D 46/2455; B01D 46/2474; B01D 46/2418; B01D 63/061; B01D 63/066;
(Continued)

(56) References Cited

U.S. PATENT DOCUMENTS 5,028,036 A * 7/1991 Sane ..................... B01D 29/012
266/227
5,853,582 A 12/1998 Grangeon et al.
(Continued)

FOREIGN PATENT DOCUMENTS

CN 103443053 A 12/2013
EP 0 778 073 A1 6/1997
(Continued)

OTHER PUBLICATIONS

International Search Report, dated Sep. 21, 2016, for PCT/FR2016/051233; French Search Report dated Apr. 13, 2016, for French Application No. 1554908.
(Continued)

*Primary Examiner* — Magali P Slawski
*Assistant Examiner* — Angel Olivera
(74) *Attorney, Agent, or Firm* — Ladas & Parry LLP; Malcolm J. MacDonald

(57) ABSTRACT

A separator element comprising a porous rigid single-piece substrate (2) presenting firstly, at its periphery, a perimeter wall ($2_1$) that is continuous between an inlet (4) for the fluid medium for treatment at one end of the porous substrate and an outlet (5) for the retentate at the other end of the porous substrate, and secondly, internally, a surface covered by a separator layer (6) and defining an open structure made up
(Continued)

of empty spaces (3) for passing a flow of the fluid medium for treatment. The empty spaces (3) are arranged in the porous substrate so as to create within the porous substrate a first flow network (R1) for the fluid medium for treatment, having at least two interconnected flow circuits ($R1_1$, $R1_2$) for the fluid medium between the inlet (4) and the outlet (5) of the porous substrate.

20 Claims, 10 Drawing Sheets

(51) Int. Cl.
*C04B 38/00* (2006.01)
*B01D 46/24* (2006.01)
*B01D 67/00* (2006.01)
*B28B 1/00* (2006.01)
*C04B 111/00* (2006.01)

(52) U.S. Cl.
CPC ......... *B01D 46/2474* (2013.01); *B01D 63/06* (2013.01); *B01D 63/061* (2013.01); *B01D 63/063* (2013.01); *B01D 63/066* (2013.01); *B01D 67/0041* (2013.01); *B01D 67/0067* (2013.01); *B01D 69/046* (2013.01); *C04B 38/0003* (2013.01); *C04B 38/0006* (2013.01); *C04B 38/0009* (2013.01); *B01D 46/24* (2013.01); *B01D 67/00* (2013.01); *B01D 2253/342* (2013.01); *B28B 1/00* (2013.01); *C04B 38/00* (2013.01); *C04B 38/0096* (2013.01); *C04B 2111/00801* (2013.01)

(58) Field of Classification Search
CPC ............ B01D 67/0041; B01D 67/0067; B01D 69/046; B01D 63/063; B01D 63/06; B01D 46/24; B01D 67/00; B01D 2253/342; B01D 46/2451; C04B 38/0003; C04B 38/0006; C04B 2111/00801; C04B 38/0009; C04B 38/0096; C04B 38/00; B28B 1/00

See application file for complete search history.

(56) References Cited

U.S. PATENT DOCUMENTS

| | | | |
|---|---|---|---|
| 6,499,606 | B1 | 12/2002 | Grangeon et al. |
| 2011/0236628 | A1* | 9/2011 | Soukhojak ............ F01N 3/0222 428/116 |
| 2014/0065350 | A1 | 3/2014 | Kobashi et al. |
| 2015/0008177 | A1* | 1/2015 | Yajima ................ B01D 63/066 210/488 |

FOREIGN PATENT DOCUMENTS

| | | |
|---|---|---|
| EP | 2 832 708 A1 | 2/2015 |
| FR | 3 006 606 | 12/2014 |
| GB | 2 223 690 A | 4/1990 |
| JP | S6331517 A | 2/1988 |
| JP | 2001232163 A | 8/2001 |
| WO | 96/28241 A1 | 9/1996 |

OTHER PUBLICATIONS

Japanese Office Action, dated Dec. 1, 2020, corresponding to Japanese Application No. 2017-561808.
Chinese Office Action, dated Jun. 9, 2020, corresponding to Chinese Application No. 201680030948.9.

* cited by examiner

| Families | | Single channel | Circular multichannel | | | | Non-circular multichannel | |
|---|---|---|---|---|---|---|---|---|
| Shape of filter element | | ○ | | | | | | |
| Number of channels | | 1 | 7 | 7 | 19 | 19 | 8 | 23 |
| Outside diameter | mm | 20 | 20 | 25 | 31/28 | 25 | 25 | 25 |
| Length | mm | 1178 | 1178 | 1178 | 1020 | 1178 | 1178 | 1178 |
| Hydraulic diameter | mm | 14.2 | 4.5 | 6 | 3 | 3.5 | 6 | 3.47 |
| Filter area | m² | 0.053 | 0.116 | 0.155 | 0.350 | 0.246 | 0.195 | 0.330 |
| S/V ratio | m²/m³ | 143 | 313 | 268 | 377 | 425 | 337 | 571 |

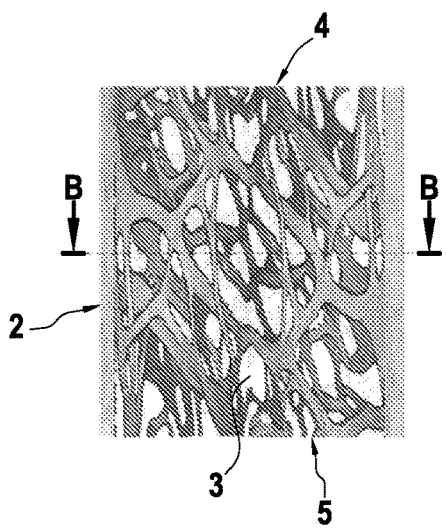
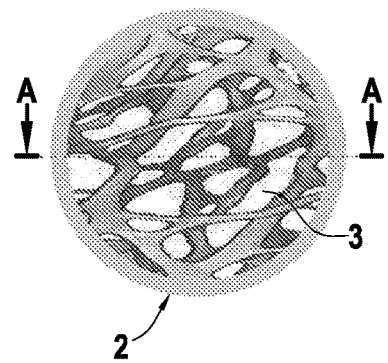
FIG.7A  FIG.7B
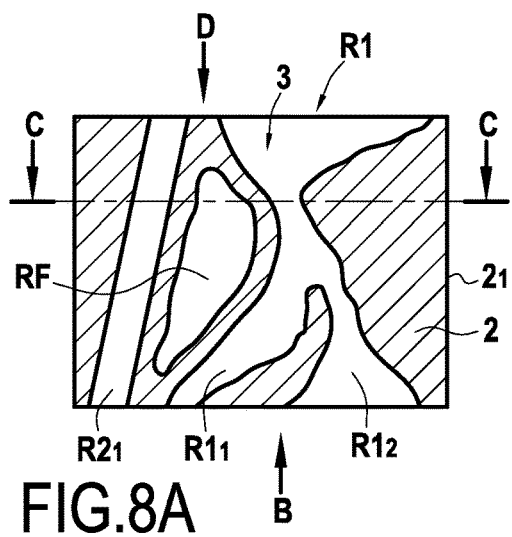
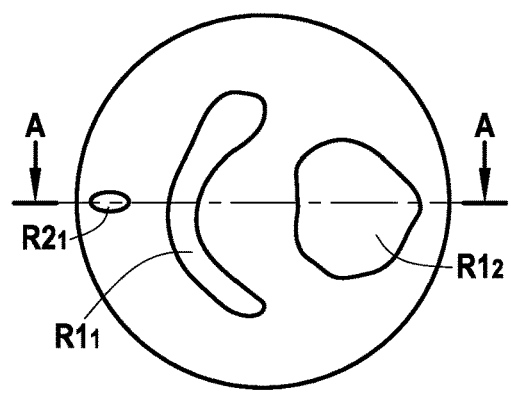
FIG.8A  FIG.8B
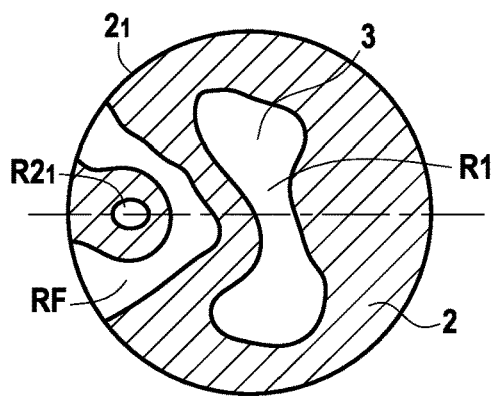
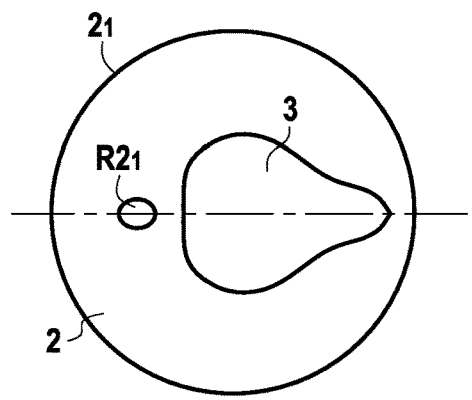
FIG.8C  FIG.8D

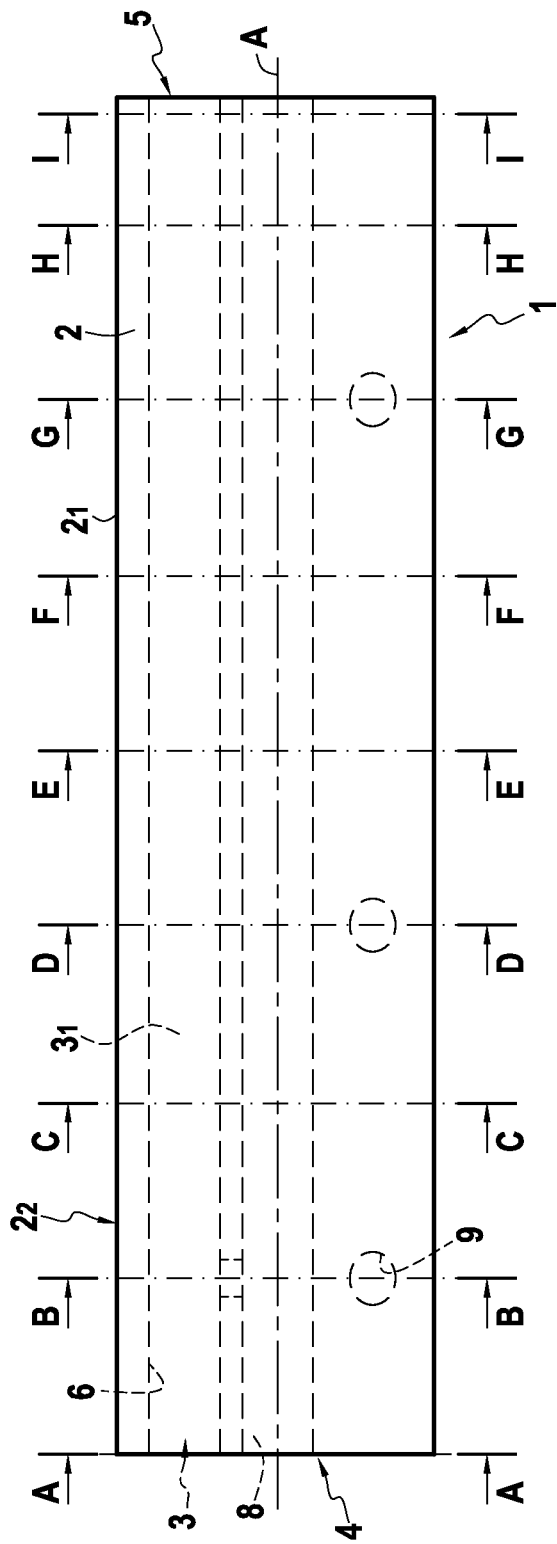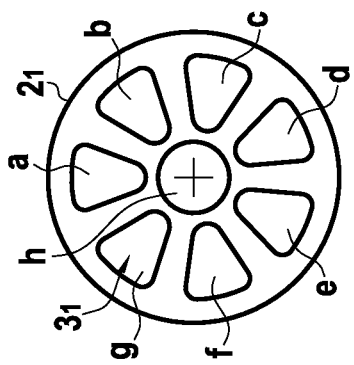

SEPARATION ELEMENT WITH A THREE-DIMENSIONAL CIRCULATION MATRIX FOR THE FLUID MEDIUM TO BE TREATED

The present invention relates to the technical field of separator elements for separating a fluid medium for treatment into a filtrate and a retentate, which elements are commonly referred to as filter membranes.

More precisely, the invention relates to new porous substrate shapes enabling the area of the filter surface of the separator elements to be increased.

Separation methods using membranes are used in numerous sectors, in particular in the environment for producing potable water and treating industrial effluents, in the chemical, petrochemical, pharmaceutical, and agrifood industries, and in the field of biotechnology.

A membrane constitutes a selective barrier and, under the action of a transfer force, it enables certain components of the medium for treatment to pass through or to be stopped. Whether components pass through or are stopped is the result of their size compared with the size of the pores in the membrane, which then behaves as a filter. Depending on the size of the pores, these techniques are referred to as microfiltration, ultrafiltration, or nanofiltration.

There exist membranes of various structures and textures. In general, membranes are constituted by a porous substrate that provides the membrane with mechanical strength and that also gives it a shape, and thus determines the filter surface of the membrane. One or more layers having a thickness of a few micrometers for performing separation are deposited on the substrate, which layers can be referred to as separator layers, filter layers, separation layers, or active layers. During separation, the filtered fluid is transferred through the separator layer and the fluid then spreads out in the porous texture of the substrate in order to go towards the outside surface of the porous substrate. This portion of the fluid for treatment that has passed through the separator layer and the porous substrate is referred to as the permeate or the filtrate and it is recovered by a collector chamber surrounding the membrane. The other portion is referred to as the retentate and it is usually reinjected into the fluid for treatment upstream from the membrane via a recirculation loop.

In conventional manner, the substrate is initially fabricated with the desired shape by extrusion, and then sintered at a temperature and for a length of time that are sufficient to achieve the required strength, while nevertheless conserving in the resulting ceramic the desired open and interconnected texture of pores. That method makes it necessary to obtain one or more rectilinear channels within which the separator layers are subsequently deposited and sintered. The substrates are conventionally tubular in shape and have one or more rectilinear channels arranged in parallel with the central axis of the substrate. In patent EP 0 778 073, the inside surfaces of the channels are smooth and they do not present any irregularities, whereas in patent GB 2 223 690, the channels present a star-shaped profile. In patent application WO 96/28241, the channel presents a helical shape.

Since the inside volume of the substrate is defined and limited by its outside dimensions and since the area of the filter surface is proportional to the number of channels, it has been found that the areas of the filter surfaces of filter membranes fabricated using substrates having such shapes come up against a ceiling and, as a result, present performance that is limited in terms of flow rate.

The principle of all tangential separation making use of filter elements lies in selective transfer, which is of effectiveness that depends on the selectivity of the membrane (the active layer) and on the permeability (flux) of the filter element in question as a whole (substrate plus active layer).

In addition to the above-described effectiveness of the selective transfer, the performance of a filter element is directly proportional to the area of the filter surface involved.

The ratio S/V where S is the area of the exchange surface of the membrane and V is the volume of the separator element can be used to characterize the compactness of a membrane:

$$\text{Compactness} = \frac{S}{V} = \frac{\text{Area of the filter surface}}{\text{Volume of the filter element}}$$

Historically and in chronological order, single-channel cylindrical tubular separator elements were the first to appear on the market, followed by multichannel tubular separator elements.

In addition to increasing the total area of the filter surface, one of the advantages of multichannel separator elements lies in obtaining channels of small hydraulic diameter without any risk of fragility for the separator elements, however the initial multichannel separator elements had channels that were exclusively of circular right section.

The following generation abandoned circular channels in order to better occupy the internal volume of the tube, to increase compactness, and to increase the possibilities of turbulence.

Thus, by way of example, a membrane having an outside diameter of 25 millimeters (mm) and a length of 1178 mm develops a filter surface having an area of 0.155 square meters ($m^2$) when it possesses seven circular channels, each having a hydraulic diameter of 6 mm, and it develops a substrate surface having an area of 0.195 $m^2$ when it possesses eight non-circular channels, likewise having a hydraulic diameter of 6 mm.

Compactness calculations for those two membranes give the following results:

$$Compactness_1 = \frac{S_1}{V} = \frac{0.155}{\pi \times (1.25 \times 10^{-2})^2 \times 1.178} = \frac{0.155}{0.00057825} \cong 268 \, \frac{m^2}{m^3}$$

$$Compactness_2 = \frac{S_2}{V} = \frac{0.195}{\pi \times (1.25 \times 10^{-2})^2 \times 1.178} = \frac{0.195}{0.00057825} \cong 337 \, \frac{m^2}{m^3}$$

$$Compactness_2 \cong 1.25 \times Compactness_1$$

It can be seen from these two examples that for given hydraulic diameter and for separator elements that are identical in shape and outside dimensions, going from channels of circular section to channels of non-circular section makes it possible to increase the value of the compactness by 25%.

The table in FIG. 1 shows these three major families of membranes fabricated from extruded tubular substrates, and for each of them it gives the compactness S/V. It is commonly accepted by the person skilled in the art that wall thicknesses between the channels are limited towards small thicknesses by the extrusion process itself because of physical parameters, mainly such as the dimensions of the particles of material distributed in the extruded paste and the plasticity of the paste given the pressure needed to cause the paste to pass through the die.

The dimensioning of the channels inside a separator element obtained by extrusion is thus limited, not only by considerations involving mechanical strength and the flux of filtrate in the pores of the porous substrate, but also by friction forces that generate a risk of tearing and/or cracking between the ceramic paste and the die.

The compactness of separator elements obtained by extrusion thus tends towards an upper limit, and the present invention proposes remedying the drawbacks of prior solutions by providing novel separator elements for which, firstly the spaces reserved for the internal flow of the fluid for treatment form interconnected three-dimensional structures creating surfaces within said separator elements that are suitable for increasing the compactness as expressed by the above-described ratio S/V, and for which, secondly the thicknesses of the skeleton-forming structural elements can be of the order of several tenths of a millimeter.

In order to achieve these objects, the separator element is a single-piece separator element for separating a fluid medium for treatment into a filtrate and a retentate, said separator element comprising a porous rigid single-piece substrate made out of a single material and presenting firstly, at its periphery, a perimeter wall that is continuous between an inlet for the fluid medium for treatment at one end of the porous substrate and an outlet for the retentate at the other end of the porous substrate, and secondly, internally, at least one surface covered by at least one separator layer and defining an open structure made up of empty spaces for passing a flow of the fluid medium for treatment in order to recover at the periphery of the porous substrate a filtrate that has passed through the separator layer and the porous substrate.

According to the invention, the empty spaces for passing the fluid medium for treatment that are defined by the surface of the substrate covered by the separator layer are arranged in the porous substrate so as to create within the porous substrate at least a first flow network for the fluid medium for treatment, the network comprising at least two interconnected flow circuits for the fluid medium for treatment between the inlet and the outlet of the porous substrate.

In the context of the invention, the novel separator elements possess internal shapes that are modulated in such a manner that it is possible to increase the total area of the filter surface of the novel separator elements designed in this way up to compactness values of 2000 square meters per cubic meter (m²/m³) or more, with this being done firstly by establishing communication between empty spaces within a given element of shapes and dimensions that can be varied, and secondly by increasing the number of flow circuits that are formed in this way.

The separator element of the invention further includes in combination one and/or more of the following additional characteristics:

the empty spaces for passing the fluid medium are arranged in the porous substrate so as to create within the porous substrate at least a second network comprising one or more flow circuits for the fluid medium between the inlet and the outlet of the porous substrate, which flow circuits may optionally be interconnected;

at least one empty space for recovering filtrate is arranged in the porous substrate and opens out through the perimeter wall of the porous substrate;

each open structure is limited by a single continuous surface between the inlet and the outlet of the porous substrate, being throughout in contact with the fluid medium and without presenting any blind space, the open structure defining three-dimensional structures from the perimeter wall of the porous substrate;

the three-dimensional structures present identity and continuity of porous material and texture all the way to the perimeter wall;

the open structure defines three-dimensional structures with geometrical configurations that are non-repetitive;

the open structure defines three-dimensional structures formed by repeating at least one pattern inscribed in a volume unit of the porous substrate forming a mesh inside which a morphologically predefined space is left empty for passing the flow of the fluid for treatment, said repetition taking place firstly by perfect or partial juxtaposition of the pattern(s) in at least one dimension of three-dimensional space, and secondly in such a manner as to obtain flow continuity for the fluid medium between the empty spaces of the volume unit and porous material continuity for discharging the filtrate;

the open structure defines three-dimensional structures formed by repeating at least one pattern without varying either the shape or the dimensions of the pattern;

the open structure defines three-dimensional structures formed by repeating at least one pattern of dimensions that vary gradually in isomorphic manner in at least one direction, and/or of morphology that varies gradually in isometric manner in at least one direction;

a pattern and a mesh that is associated therewith may present one or more of the symmetries from the following list:

central symmetry;

orthogonal symmetry relative to a straight line;

mirror symmetry relative to a plane;

rotational symmetry; and symmetry by similarity;

the repetition of the pattern(s) presents symmetry relative to the external symmetry of the substrate;

the porous substrate is made of a material that is organic or inorganic;

a porous substrate and at least one separator layer continuously deposited on the walls of the three-dimensional structures, each layer being constituted by a ceramic selected from among oxides, nitrides, carbides, and other ceramic materials, and mixtures thereof, and in particular from titanium oxides, alumina, zirconia, and a mixture thereof, titanium nitride, aluminum nitride, boron nitride, silicon carbide, and titanium carbide, optionally mixed with another ceramic material;

a porous substrate and at least one separator layer continuously deposited on the walls of the three-dimensional structures, each layer being constituted by a polymer adapted to the intended separation and deposited from a collodion of the polymer; and the porous substrate presents a mean pore diameter lying in the range 1 micrometer (μm) to 100 μm.

The following description given with reference to the accompanying figures enables the invention to be understood better.

FIGS. 7A and 7B are respectively a longitudinal section and a transverse section through an embodiment of a porous substrate in which the open structure defines three-dimensional structures with non-repeating geometrical configurations.

FIG. 8A is an elevation section view of an embodiment of a separator element in accordance with the invention seeking to create a flow network for the filtrate.

FIG. 8B is a view from beneath of the separator element shown in FIG. 8A.

FIG. 8C is a section view on lines C-C of the separator element shown in FIG. 8A.

FIG. 8D is a view from above the separator element shown in FIG. 2.

FIG. 9 is a longitudinal section view of another embodiment of a separator element in accordance with the invention.

FIG. 9A is an end view looking along arrows A-A of FIG. 9.

Figures 1, 2A, 2B, 2C, 2D:
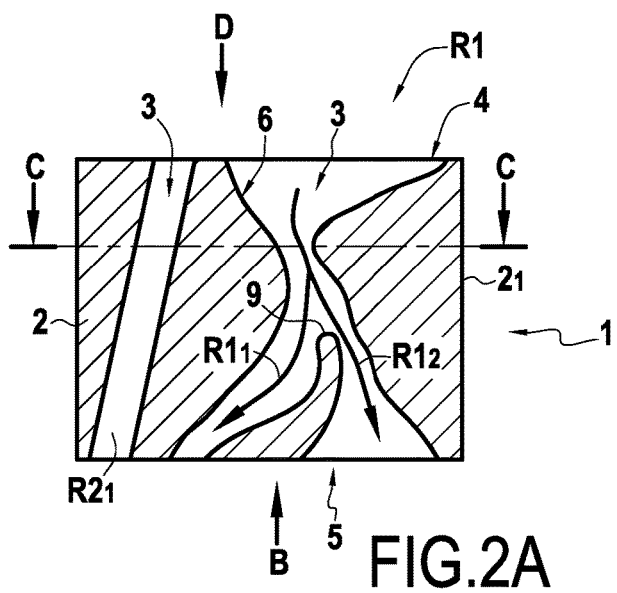
FIG. 1 is a table giving compactness values S/V for various separator elements in the prior art.
FIG. 2A is an elevation section view of a first embodiment of a separator element in accordance with the invention.
FIG. 2B is a view from beneath of the separator element shown in FIG. 2A.
FIG. 2C is a section view on lines C-C of the separator element shown in FIG. 2A.
FIG. 2D is a view from above of the separator element shown in FIG. 2A.

As a preliminary point, definitions are given of some of the terms used in the context of the invention. The term "mean pore diameter" is used to mean the d50 value of a volume distribution at which 50% of the total volume of the pores corresponds to the volume of pores having a diameter less than this d50. The volume distribution is the curve (analytic function) representing the frequencies of pore volumes as a function of their diameters. d50 corresponds to the median separating into two equal portions the area situated under the curve of frequencies as obtained by mercury penetration for mean pore diameters greater than or equal to 4 nanometers (nm), or as obtained by adsorbing gas, in particular $N_2$, when the mean pore diameters are less than 4 nm, these two techniques being retained as references in the context of the invention for measuring mean pore diameters.

In particular, it is possible to use the techniques described in:
   ISO standard 15901-1:2005 for the measurement technique using mercury penetration; and
   ISO standards 15901-2:2006 and ISO 15901-3:2007 for the measurement technique using gas adsorption.

The invention proposes separator elements operating by tangential flow to separate a fluid medium for treatment into a filtrate and a retentate, each element comprising a monolithic porous substrate of shape selected to define circuits inside the porous substrate for passing a flow of the fluid medium for treatment, which circuits are interconnected with one another. Such monolithic substrates, defined as being made as a single piece out of only one material that is uniform and continuous throughout, without bonds nor exogenous contributions, cannot be made by conventional extrusion techniques, but can be made, e.g. by additive techniques such as those described in patent application FR 3 006 606, for example.

The invention seeks to provide separator elements for separating a fluid medium by tangential filtering, commonly referred to filter membranes. In general manner, and as shown in FIGS. 2A to 2D, such separator elements 1 comprise a porous rigid single-piece substrate 2 made out of a single material. For such separator elements, the body constituting the substrate 2 presents a porous texture. This porous texture is characterized by the mean diameter of the pores as deduced from their distribution as measured by mercury penetration porometry.

The porous texture of the substrate is open and forms a network of interconnected pores, thus enabling the fluid that has filtered through the filter separator layer to pass through the porous substrate and be recovered at its periphery. It is common practice to measure the permeability to water of the substrate in order to qualify the hydraulic resistance of the substrate, which simultaneously makes it possible to confirm that the porous texture is interconnected. Specifically, in a porous medium, the steady flow of an incompressible viscous fluid is governed by Darcy's law. The speed of the fluid is proportional to the pressure gradient and inversely proportional to the dynamic viscosity of the fluid, via a characteristic parameter known as "permeability" that may be measured, for example, in compliance with French standard NF X 45-101, of December 1996.

Usually, the porous substrate 2 is made of a non-metallic inorganic material. Preferably, the porous substrate 2 is made of a ceramic, selected from among oxides, nitrides, carbides, and other ceramic materials, and mixtures thereof, and in particular from titanium oxide, alumina, zirconia, and mixtures thereof, titanium nitride, aluminum nitride, boron nitride, and silicon carbide, possibly mixed with some other ceramic material. It should be observed that the porous substrate may also be made out of an organic material or out of an inorganic material that is purely metallic. For example, the porous substrate 2 may be made of a pure metal such as aluminum, zinc, copper, or titanium or in the form of an alloy of a plurality of these metals, or of stainless steels. For example, the porous substrate 2 may present a mean pore diameter lying in the range 1 µm to 100 µm.

Whatever the material used, the invention makes use of the method described in patent application FR 3 006 606 in which the substrate is fabricated by using an additive method.

Internally, the porous substrate 2 includes at least one open structure 3 formed by empty spaces for the flow of the fluid medium for treatment. These empty spaces 3 correspond to zones of the porous substrate that do not include porous material. These empty spaces 3 are arranged within the porous substrate 2 so that the porous substrate presents at its periphery a perimeter wall $2_1$ that is continuous between an inlet 4 for the fluid medium situated at one end of the porous substrate and an outlet 5 for the retentate situated at the other end of the porous substrate.

In the embodiment shown in FIGS. 2A to 2D, the porous substrate 2 is in the form of a cylinder of circular section. Naturally, the shape of the porous substrate 2 is given purely by way of illustration, and the porous substrate 2 could take on any possible shape. In this example shown, the porous substrate 2 is an elongate element with the inlet 4 for the fluid medium for treatment situated at one of the ends of the porous substrate while the outlet 5 for the retentate is situated at the opposite end of the porous substrate. Thus, the open structure formed by the empty spaces 3 arranged within the porous substrate communicates firstly with the inlet 4 of the fluid medium for treatment and secondly with the outlet 5 for the retentate. As shown in the description below, the fluid medium enters or leaves the inlet 4 or the outlet 5 of the porous substrate respectively via one or more separate openings. In other words, the open structure 3 for the flow of the fluid medium is arranged in the porous substrate 2 so as to open out firstly at the inlet end of the porous substrate via one or more openings forming the inlet 4, and secondly, at the outlet end of the porous substrate via one or more openings forming the outlet 5.

The portion of the porous substrate 2 defining the open structure 3 presents a surface that is covered by at least one separator layer 6 that is to be in contact with the fluid medium for treatment flowing inside the open structure 3. A fraction of the fluid medium for treatment passes through the separator layer 6 and the porous substrate 2 so that this treated fraction of the fluid, referred to as the filtrate or the permeate, flows out via the perimeter wall or the outside surface $2_1$ of the porous substrate. The filtrate is recovered on the peripheral surface of the porous substrate by any appropriate means.

The separating filter layer 6 that covers the walls of the open structure 3 serves to filter the fluid medium for treatment. In other words, the open structure 3 without porous material is surrounded between the inlet 4 and the outlet 5 by the separating filter layer 6. By definition, the separating filter layers need to have a mean pore diameter that is smaller than the mean pore diameter of the porous substrate 2. The separator layers define the surface of the tangential flow separator elements that is to come into contact with the fluid for treatment and on which the fluid for treatment flows.

The tangential flow separator element generally presents a length of 1 m to 1.5 m. The section of a tangential flow separator element usually presents an area of 0.8 cm² to 14 cm². The thicknesses of the separating filter layers lie typically in the range 1 µm to 100 µm. Naturally, in order to perform the separation function and serve as an active layer, the separator layers present a mean pore diameter that is less than the mean pore diameter of the substrate. Usually, the mean pore diameter of the separating filter layers is less than the mean pore diameter of the substrate by a factor of at least three, and preferably of at least five.

The concepts of separator layers for microfiltration, ultrafiltration, and nanofiltration are well known to the person skilled in the art. It is generally accepted that:
microfiltration separator layers present a mean pore diameter lying in the range 0.1 µm to 2 µm;
ultrafiltration separator layers present a mean pore diameter lying in the range 0.01 µm to 0.1 µm; and
nanofiltration separator layers present a mean pore diameter lying in the range 0.5 nm to 10 nm.

It is possible for a micro- or ultrafiltration layer to be deposited directly on the porous substrate (a single-layer separator layer), or else on an intermediate layer of smaller mean pore diameter, itself deposited directly on the porous substrate. By way of example, the separator layer may be based on or constituted exclusively by one or more metal oxides, carbides, or nitrides, or other ceramics. In particular, the separator layer is constituted by at least one separator membrane deposited continuously on the walls of the three-dimensional structures, each layer being constituted by a ceramic selected from oxides, nitrides, carbides, and other ceramic materials, and mixtures thereof, and in particular titanium oxide, alumina, zirconia, or a mixture thereof, titanium nitride, aluminum nitride, boron nitride, silicon carbide, titanium carbide, possibly mixed with some other ceramic material. Furthermore, the separator layer 6 may be constituted by at least one separator layer deposited continuously on the walls of the three-dimensional structures, each layer being constituted by a polymer suitable for the intended separation and deposited from a collodion of the polymer.

According to a essential characteristic of the invention, the empty spaces 3 for passing the fluid medium for treatment are arranged in the porous substrate 2 so as to create at least a first network $R_1$ within the porous substrate, and more generally so as to create K networks R1, R2, ..., RK with at least one network R1 having at least two circuits $R1_1$, $R1_2$ for passing a flow of the fluid medium for treatment, and more generally N circuits $R1_1$, $R1_2$, ..., $R1_2$, ..., $R1_N$ that are mutually interconnected (where N is greater than or equal to 2) between the inlet 4 and the outlet 5 of the porous substrate. Thus, the fluid medium flows in a first network R1 having at least two flow circuits $R1_1$, $R1_2$ each communicating with the inlet 4 and the outlet 5 of the porous substrate, these two flow circuits $R1_1$, $R1_2$ communicating with each other between the inlet 4 and the outlet 5 of the porous substrate. Naturally, a fraction of the fluid medium for treatment flowing in these networks and circuits passes through the separator layer and the substrate 2 so that this treated fraction, referred to as permeate or filtrate, is recovered at the peripheral surface of the substrate.

It should be observed that the fluid medium may also flow in at least a second network R2 having one flow circuit $R2_1$ or a series of flow circuits $R2_1$, $R2_2$, $R2_3$, ... that are connected together. Each of these networks R1, R2, ..., R2K is considered as being independent relative to the other network in the sense that the fluid medium for treatment flowing in the circuit(s) of any one network does not flow in the circuit(s) of another network.

During its passage through the porous substrate 2 via the first network R1, the fluid medium for treatment encounters either at least one bifurcation or at least one separation causing the fluid medium to split into a plurality of portions (at least two) in order to follow different paths, and/or else at least one junction leading to a plurality of portions of the fluid medium for treatment (at least two such portions) being united that come from different paths. Thus, the flow circuits $R1_1$, $R1_2$ of the network R1 communicate with each other via crossings or interconnections 9 formed within the porous substrate.

Naturally, the number of flow circuits for the fluid medium for treatment making up a network may vary in the range 2 to N, where N is an integer. Likewise, the number of interconnections 9 between the flow circuits may vary from 1 to M. These interconnections are arranged between the flow circuits constituting a flow network. Likewise, it should be observed that the flow circuits communicate with the inlet 4 and the outlet 5 of the porous substrate, in zones that are common or separated from the porous substrate.

In the embodiment shown in FIGS. 2A to 2D, the porous substrate 2 has a first flow network R1 for the fluid medium for treatment made up of two flow circuits $R1_1$, $R1_2$ for the fluid medium, presenting a common inlet 4 and two distinct openings forming the outlet 5. These two flow circuits $R1_1$, $R1_2$ possess a common segment from the inlet 4 to an interconnection 9 where the two flow circuits $R1_1$, $R1_2$ are interconnected. From the interconnection 9, the fluid medium for treatment is separated into two portions all the way to the outlet 5. The two flow circuits $R1_1$, $R1_2$ thus open out into the outlet 5 via two distinct openings.

Naturally, the embodiment shown in FIGS. 2A to 2D is given in order to illustrate the principle of the invention. As explained above, the number of flow circuits $R1_1$, $R1_2$, ..., $R1_N$ forming a network may be arbitrary. Likewise, the interconnections 9 formed in the flow circuits are arbitrary in number, this number being identical or different in the various flow circuits.

In the embodiment shown in FIGS. 2A to 2D, the porous substrate 2 includes a second network R2 having a single flow circuit $R2_1$ for the fluid medium communicating both with the inlet 4 and with the outlet 5. This single flow circuit $R2_1$ of the second network R2 does not communicate with any of the flow circuits of the first network R1. Naturally, this second network R2 may comprise a plurality of interconnected flow circuits for the fluid medium between the inlet and the outlet of the porous substrate, as explained above.

From the above description, it can be seen that the empty spaces 3 arranged in the porous substrate for passing the fluid medium define one or more open structures, each corresponding to a network. According to an advantageous characteristic, each open structure is limited by a single continuous surface between the inlet and the outlet of the porous substrate, so as to be in contact everywhere with the fluid medium for treatment without presenting any blind space. In other words, the empty spaces are arranged so as to avoid creating retention zones for the fluid medium where the fluid medium for treatment might stagnate. This applies for example for a blind circuit segment having its inlet and outlet for the fluid medium situated at the same location relative to the flow direction of the fluid, with the fluid medium stagnating or reversing its travel direction between the inlet/outlet and the end of the blind circuit.

According to an advantageous characteristic, it should be considered that this open structure that is arranged for making a network of interconnected circuits defines three-dimensional structures all the way to the perimeter wall $2_1$ of the porous substrate.

According to a characteristic of the invention, these three-dimensional structures possess an identity and a continuity of porous material and texture all the way to the outside of the perimeter wall $2_1$. In other words, the material constituting these three-dimensional structures is identical and presents a porous texture that is constant to within the accuracy of the fabrication method.

According to an advantageous embodiment characteristic, the three-dimensional structures are formed by repeating at least one pattern 11 incorporated in a volume unit of the porous substrate forming a mesh 12 within which a morphologically predefined space 3 is left empty for passing the flow of the fluid for treatment. The pattern 11 is repeated firstly by exact or partial juxtaposition of the pattern(s) along at least one dimension of three-dimensional space, and secondly so as to obtain flow continuity for the fluid medium between the empty spaces 3 of the volume unit and porous material continuity for discharging the filtrate.

Figure 3A:
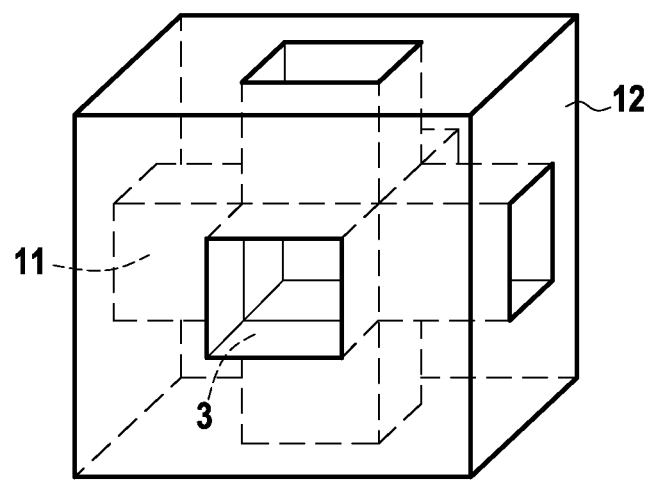
FIG. 3A shows an elementary cubic mesh within which the empty spaces form a cruciform pattern with central symmetry.

FIG. 3A shows an elementary cubic mesh 12 within which the empty spaces 3 for forming the structure constitute a cruciform pattern 11 having central symmetry. The pattern 11 is in the form of a cross in a plane and in the example shown it has a square section for the various portions of the pattern.

The use of such a mesh 12 in association with such a pattern 11 in the context of the invention finds a particularly advantageous application when the structure is formed by interleaving two identical flow circuits.

In order to simplify the description of this structure, it is proposed to characterize a cubic mesh 12 containing a symmetrical cruciform pattern 11 with the side of the cubic mesh 12 in which the pattern is incorporated being written c, with a being the dimension characterizing the square opening of the pattern that is flush with the frontier of the mesh, and with L being the characteristic length of each portion of the square section network, so that the filtering surface area of the pattern is given by the following formula:

$$S_{pattern} = 6 \times (4a \times L)$$

and with $$L = \frac{c-a}{2}$$

this becomes:

$$S_{pattern} = 6 \times \left(4a \times \left(\frac{c-a}{2}\right)\right) = 12a(c-a)$$

The volume of the mesh is $V_{mesh} = c^3$, so the compactness of the separator element obtained by stacking and juxtaposing this mesh containing this pattern is obtained by the following formula:

$$\frac{S_{pattern}}{V_{mesh}} = \frac{12a(c-a)}{c^3}$$

If the resulting circuit is assumed to be a composition of interconnected square section channels, their hydraulic diameter Dh is then equal to a and it becomes possible to compare the compactness of such a structure of the invention formed by two circuits of this type with the above-described compactness for separator elements obtained by extrusion.

A separator element fabricated in this way, with a set at 3.47 mm and with c equal to 7.94 mm possesses a minimum thickness e of porous material between the two circuits that is equal to 0.5 mm and an intrinsic compactness equal to:

$$2 \times \frac{S_{pattern}}{V_{mesh}} = 2 \times \frac{12a(c-a)}{c^3} = 24 \times \frac{3.47(7.94-3.47)}{7.94^3} \cong 0.77 \frac{mm^2}{mm^3}$$

which corresponds to a compactness of 743.7 $m^2/m^3$ to be compared with a filter element obtained by extrusion having an outside diameter of 25 mm, a length of 1178 mm, and possessing 23 rectilinear non-circular channels of hydraulic diameter of Dh=3.47 mm by observing that there is an increase in compactness of about 30% (Table 1).

TABLE 1

| Dh = 3.47 mm | Rectilinear multichannels | Two circuits example 1 |
|---|---|---|
| Compactness | 571 m²/m³ | 744 m²/m³ |
| Increase in compactness | | +30% |

Figure 3B:
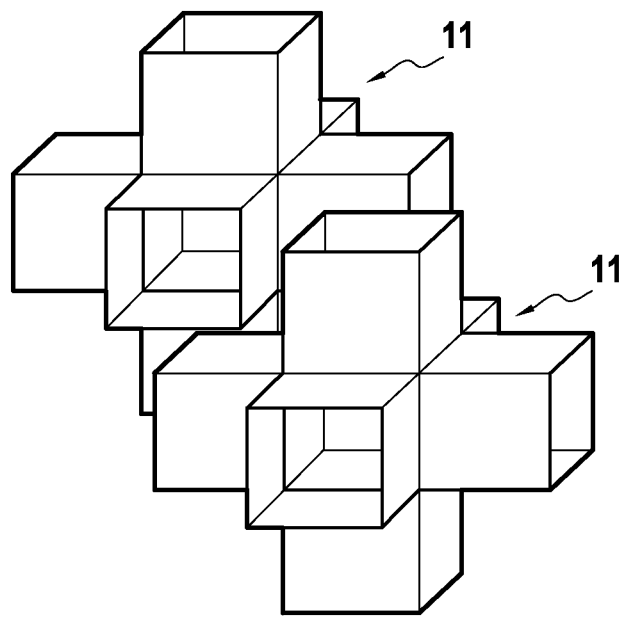
FIGS. 3B and 3C are respectively a perspective view and a plan view showing the interleaving of two circuits made by interleaving the pattern shown in FIG. 3A.
Figure 3C:
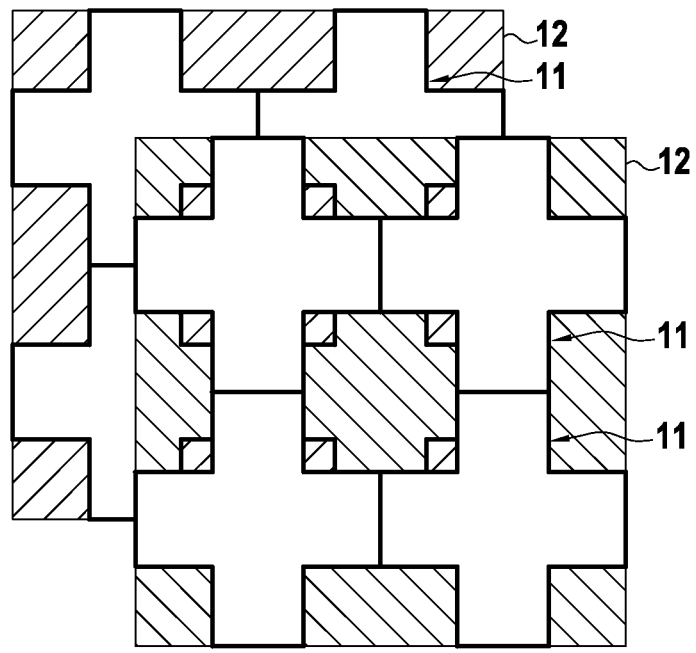

FIGS. 3B and 3C show and dimension the interleaving of the two circuits made by interleaving the pattern shown in FIG. 3A.

In comparison with a filter element obtained by extrusion having an outside diameter of 20 mm, a length of 1178 mm, and possessing 61 rectilinear non-circular channels of hydraulic diameter Dh=1.60 mm, the same construction of a structure having two identical circuits gives, for a hydraulic diameter Dh of 1.60 mm, an increase in compactness of 28% (Table 2):

TABLE 2

| Dh = 1.60 mm | Rectilinear multichannels | Double circuits Example 1 |
|---|---|---|
| Compactness | 1054 m²/m³ | 1347 m²/m³ |
| Increase in compactness | | +28% |

In comparison with a filter element obtained by extrusion having an outside diameter of 25 mm, a length of 1178 mm, and possessing eight rectilinear non-circular channels of hydraulic diameter Dh=6.00 mm, the same construction of a structure having identical double circuits gives, for a hydraulic diameter Dh of 6.00 mm, an increase in compactness of 36% (Table 3):

TABLE 3

| Dh = 6.00 mm | Rectilinear multichannels | Double circuits Example 1 |
|---|---|---|
| Compactness | 337 m²/m³ | 459 m²/m³ |
| Increase in compactness | | +36% |

Figure 3D:
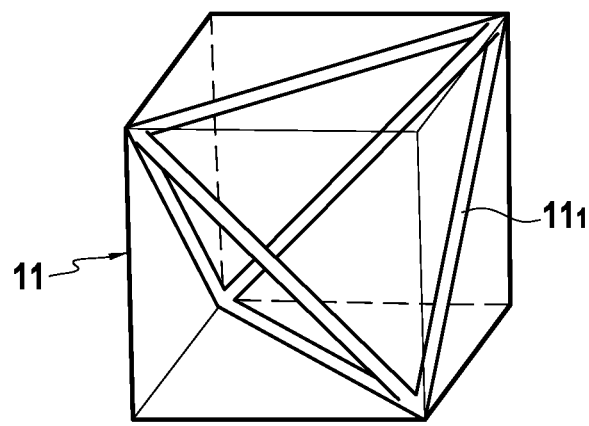
FIG. 3D shows another embodiment of a structure having two circuits resulting from the combination of a pattern having cubic symmetry and a pattern having tetrahedral symmetry.
Figure 4A:
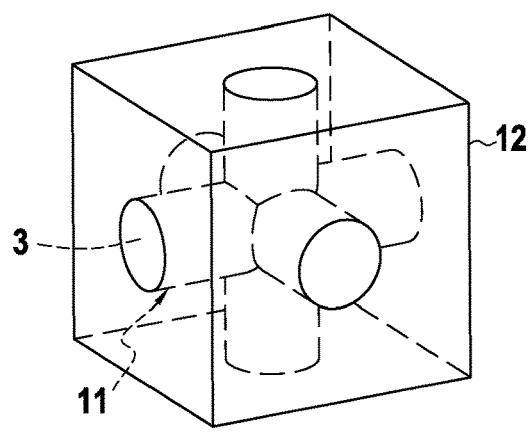
FIGS. 4A to 4D show the embodiment of an open structure formed by repeating a pattern of cruciform shape with central symmetry relative to the center of a cubic mesh in which the pattern is inscribed.
Figure 4B:
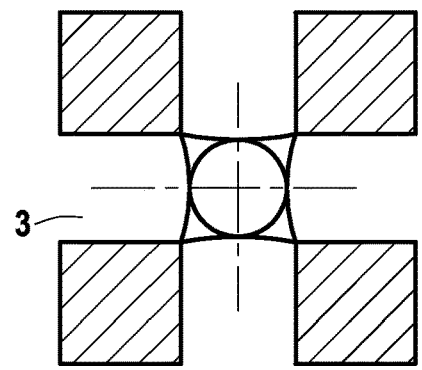
Figure 4C:
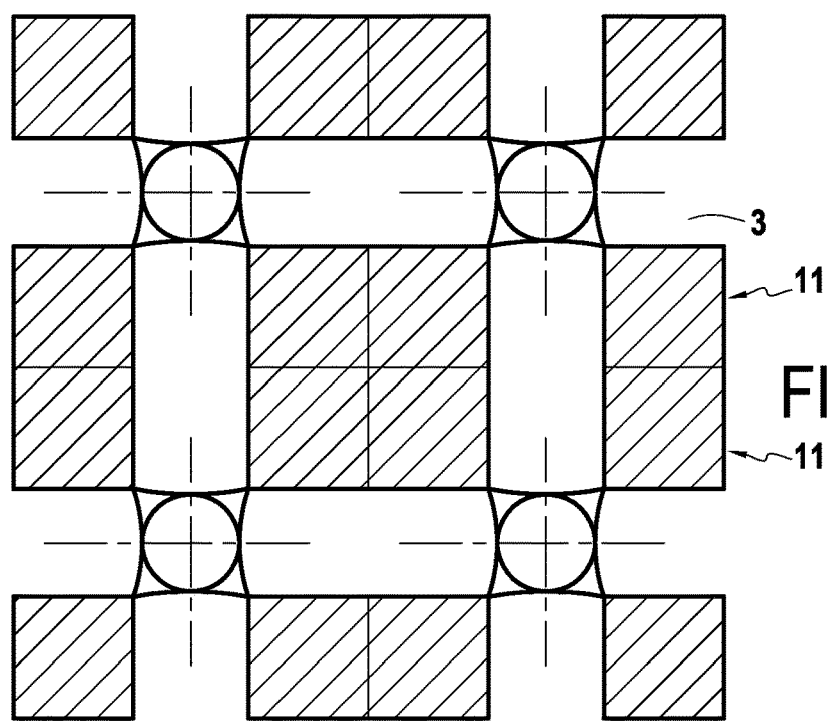
Figure 4D:
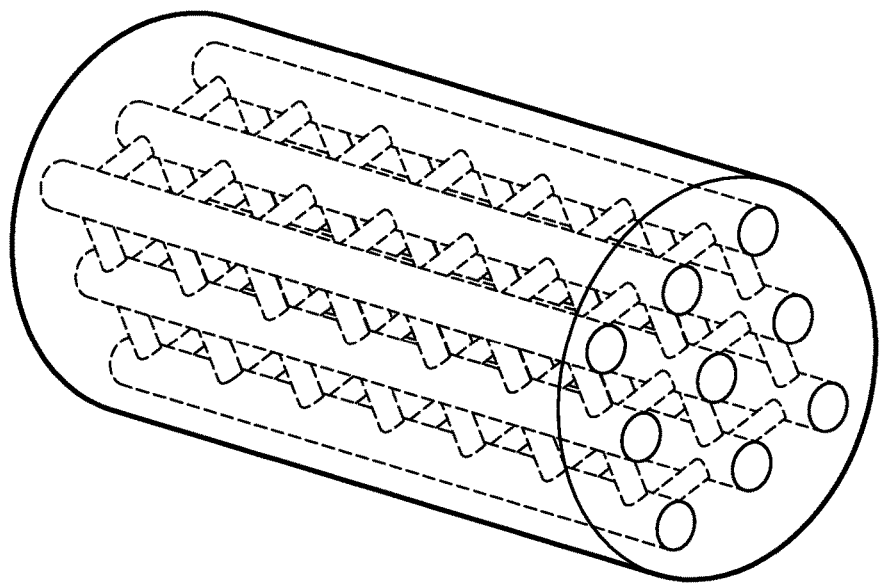

FIG. 3D shows another embodiment of a structure having double circuits resulting from combining a pattern 11 of cubic symmetry and a pattern 11₁ of tetrahedral symmetry. The first circuit formed by the interconnected voids follows the edges and the diagonals of the faces of a cube, and the second circuit follows the edges of an octahedron placed at the center of the same cube.

This combination of two patterns leads to the construction of a single network for which it can be seen that the cubic elementary mesh contains a set of interconnected void spaces having a regular tetrahedral pattern.

Stacking such a pattern in the three directions of three-dimensional space, while imparting successive turns to the pattern so that the empty spaces of the edges of the tetrahedron coincide and juxtapose in repetitive and continuous manner makes it possible to obtain the following new compactness values, returning by way of example and for comparison purposes to the same extruded separator elements and the same three hydraulic diameters as used in example 1 (Table 4):

TABLE 4

| | Dh = 1.60 mm | Dh = 3.47 mm | Dh = 6.00 mm |
|---|---|---|---|
| Rectilinear multichannels | 1054 m²/m³ | 571 m²/m³ | 337 m²/m³ |
| Single network example 2 | 2358 m²/m³ | 987 m²/m³ | 560 m²/m³ |
| Increase in compactness | +123% | +72% | +66% |

It can be seen that with such a structure, there are increases in compactness of 66%, 72%, and 123% respectively for hydraulic diameters of 6 mm, 3.47 mm, and 1.6 mm.

FIGS. 4A to 4D show an embodiment of an open structure 3 formed by repeating a pattern 11 of cruciform shape with central symmetry relative to the center of a cubic mesh 12 in which the pattern is inscribed. In this example, the pattern 11 presents the shape of a cross in a plane with a circular section for the various portions of the pattern. The pattern shown in FIG. 4A and corresponding to the space left empty for passing a flow of the fluid medium is repeated by stacking the mesh and the pattern in identical manner along one, two, or three dimensions of three-dimensional space.

Figures 5A, 5B:
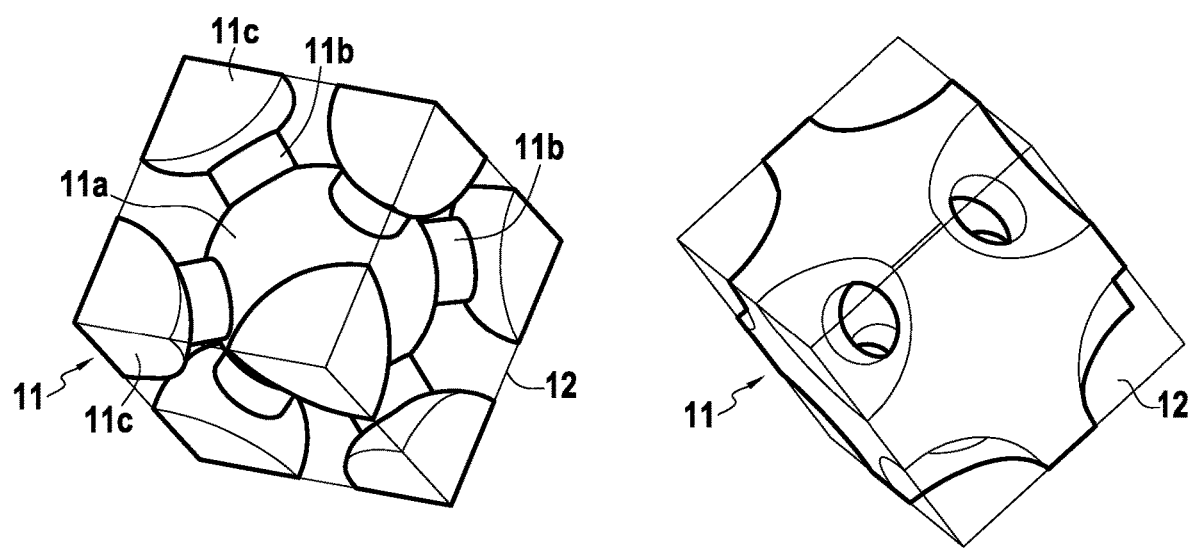
FIGS. 5A and 5B show two other embodiments of a pattern in a cubic elementary mesh.

FIGS. 5A and 5B show two other embodiments of a pattern 12 in a cubic elementary mesh 12. The patterns shown 11 are complementary in the sense that if the pattern shown in FIG. 5A corresponds to empty space then the pattern shown in FIG. 5B corresponds to porous matter and vice versa. Each pattern 11 comprises a central sphere 11a connected, via eight cylinders 11b extending towards respective corners of the mesh, to eight quarter spheres 11c, each occupying three contiguous sides of the mesh 12. Juxtaposing this mesh 12 makes it possible to obtain a structure made up of spheres that are interconnected by cylinders.

It is clear that it is possible to envisage using patterns 11 with a wide variety of shapes. For example, a pattern 11 and the associated mesh may present one or more symmetries selected from the following list:
   central symmetry;
   orthogonal symmetry relative to a straight line;
   mirror symmetry relative to a plane;
   rotational symmetry; and
   symmetry by similarity.

Likewise, it should be observed that repeating the pattern (s) 11 may present symmetry relative to the external symmetry of the substrate. Under such circumstances, the porous substrate may have an external profile that varies, optionally presenting symmetry.

In the above examples, the open structure 3 defines three-dimensional structures formed by repeating at least one pattern 11 without variation, neither of shape nor of the dimensions of the pattern.

Naturally, it may be envisaged to make the open structure 3 defining three-dimensional surfaces by repeating at least one pattern 11 of dimensions that vary gradually in isomorphic manner in at least one direction and/or of morphology that varies gradually in isometric manner in at least one direction.

Figure 6A:
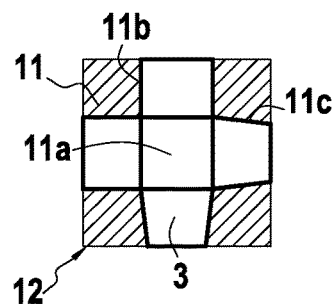
FIGS. 6A to 6D show a variant embodiment of a porous substrate in which an open structure is made defining three-dimensional structures by repeating a pattern of dimensions that vary gradually in isomorphic manner in three spatial directions.

FIGS. 6A to 6D show a variant embodiment of a porous substrate 2 in which an open structure 3 is made defining three-dimensional structures by repeating a pattern 11 of dimensions that vary gradually in isomorphic manner in the three dimensions of three-dimensional space. In this variant, the pattern 11 shown in FIG. 6A is inscribed in a square mesh 12 and has a central square 11a lying between two identical rectangles 11b on two adjacent sides and between two identical trapezoids 11c on its other two adjacent sides.

Figure 6B:
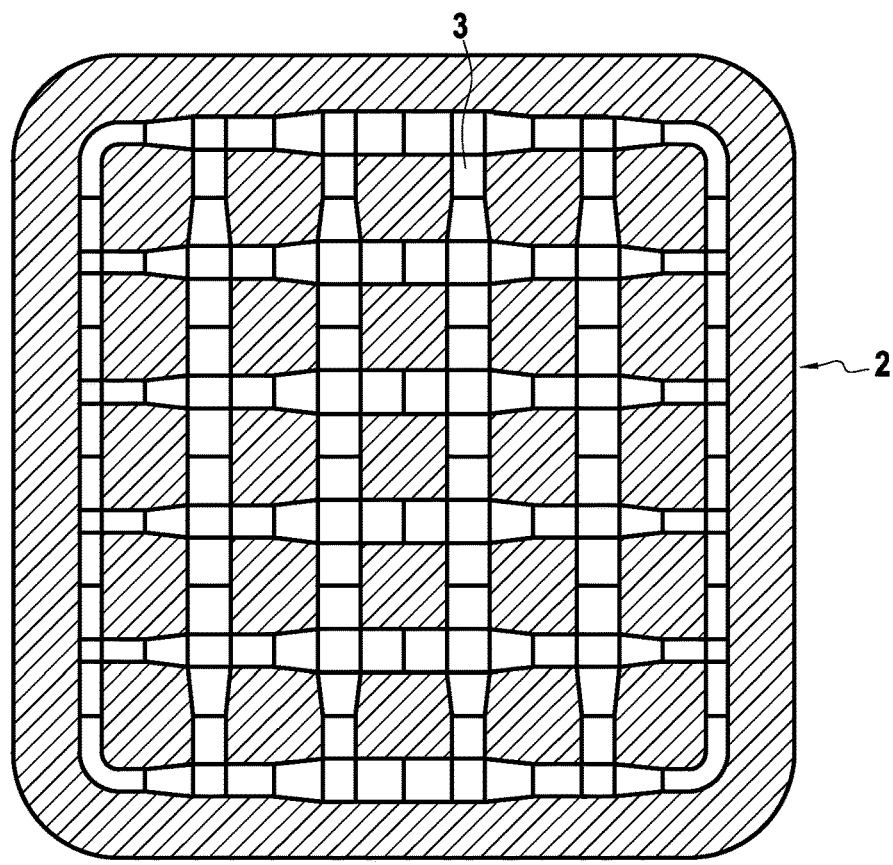
Figure 6C:
Figure 6D:
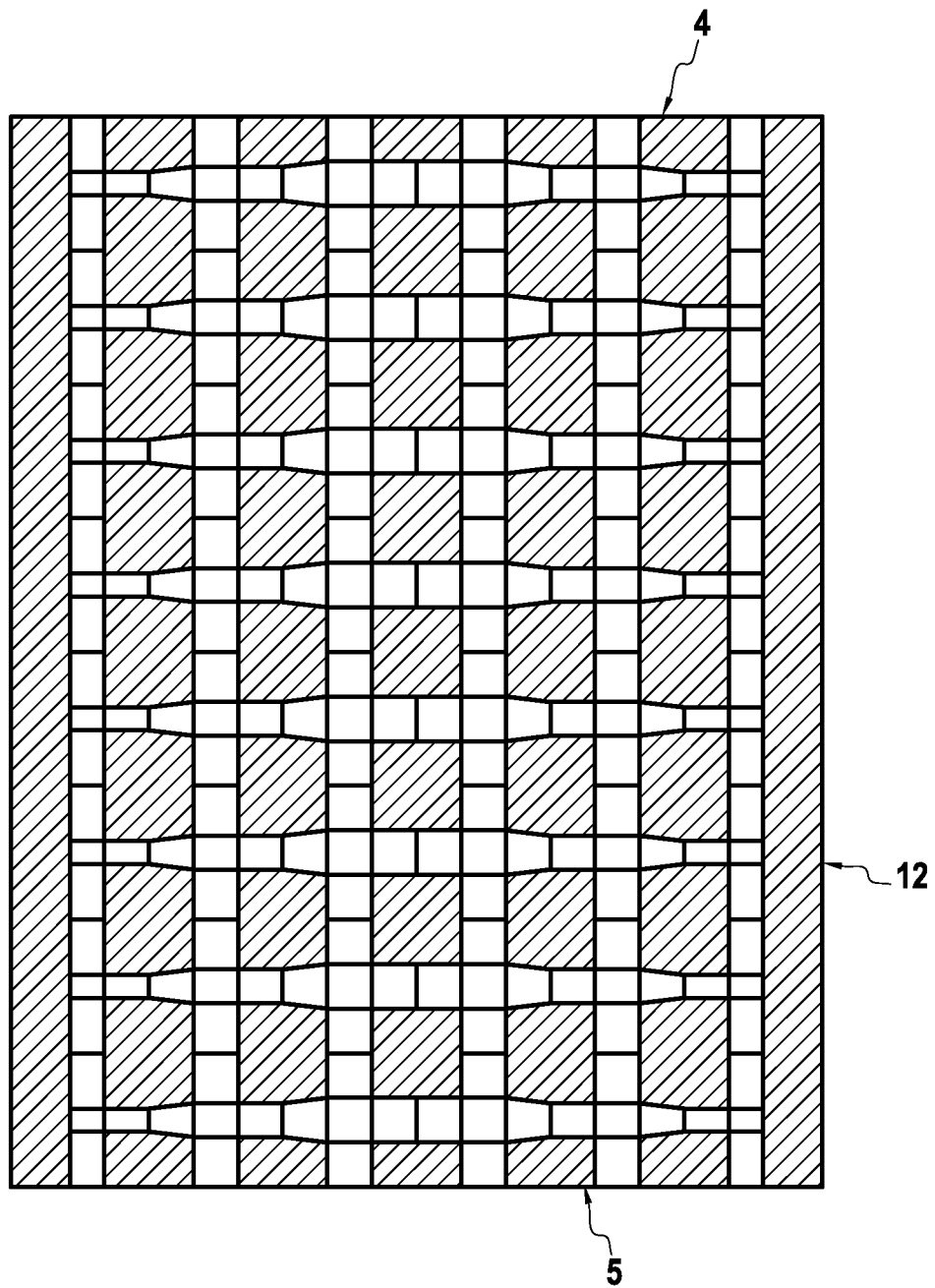

By juxtaposing such a pattern 11 in two x and y directions, and by gradually varying in isomorphic manner while adjusting stepwise the dimensions of the spaces corresponding to the rectangles 11b, the square 11a, and the trapezium 11c, it is possible to obtain a substrate as shown in FIG. 6B. Naturally, the peripheral patterns 11 are adapted to avoid creating blind spaces that might give rise to spaces that retain the fluid medium in the long term. A gradual increase towards the periphery of the porous material can be seen which facilitates discharging of the filtrate. This juxtaposition in the x and y directions itself forms a pattern (FIG. 6C) that is stacked identically, e.g. eight times in a third direction z, thereby enabling a structure to be formed that extends continuously between the inlet 4 and the outlet 5 of the porous substrate 12 (FIG. 6D).

In the above-described embodiment, the open structure 3 defines three-dimensional structures with repetitive geometrical configurations. FIGS. 7A and 7B show an embodiment of a porous substrate 2 of open structure 3 that defines three-dimensional structures having geometrical configurations that do not repeat. Thus, the three-dimensional structures are made in disordered manner without repetition while naturally constructing continuity of porous material to discharge the filtrate through the porous material and continuity of empty spaces for the flow of the fluid medium between the inlet 4 and the outlet of the substrate 12 without creating blind zones.

In the above examples, the empty spaces 3 are created in the porous material so as to allow the fluid medium to flow. FIGS. 8A to 8D show an embodiment of a porous substrate 2 in which a network RF is provided for recovering the filtrate and that exits through the perimeter wall $2_1$ of the porous substrate. Naturally, such a recovery network RF for the filtrate is independent of the flow network(s) R1, R2, . . . , RK for the fluid medium. This filtrate recovery network RF leaves some of the porous material constituting the porous substrate remaining between this empty space and flow networks, and also between this empty space and the inlet and outlet ends 4 and 5 of the substrate. Such a filtrate recovery network RF is created to facilitate discharging filtrates to the outside of the porous substrate.

Figure 9B:
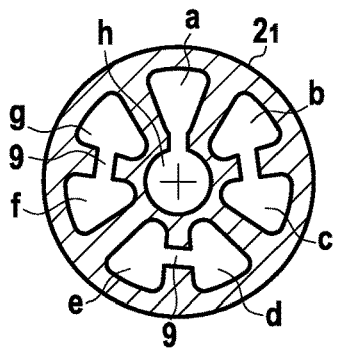
FIGS. 9B to 9I are cross-section views seen looking along arrows B to I respectively in FIG. 9.
Figure 9C:
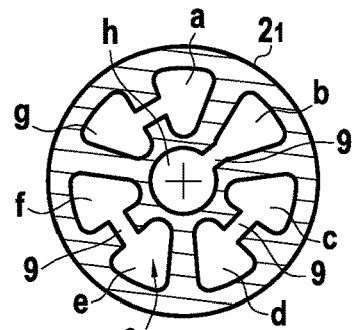
Figure 9D:
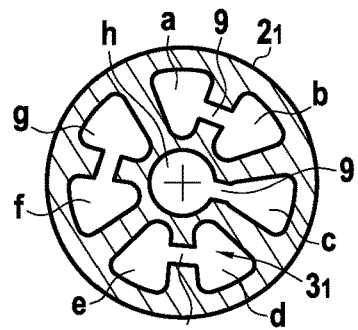
Figure 9E:
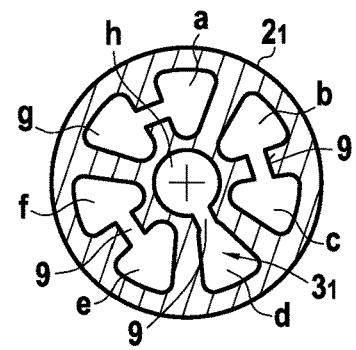
Figure 9F:
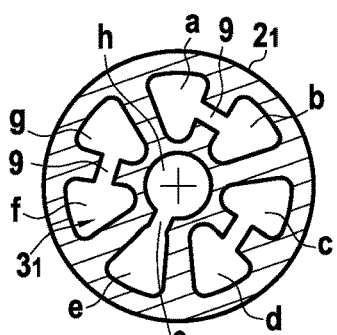
Figure 9G:
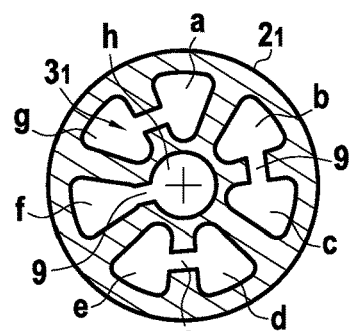
Figure 9H:
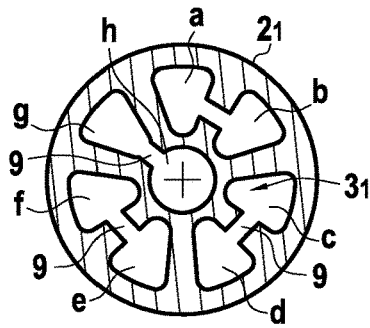
Figure 9I:
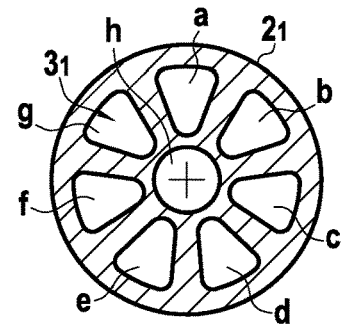

FIGS. 9 to 9I show another example of a tangential flow separator element 1 of tubular shape. The tangential flow separator element 1 comprises a porous substrate 2 made with an elongate shape extending along a longitudinal central axis A such that the structure of this porous substrate can be said to be rectilinear. The porous substrate 2 shown in FIGS. 9, 9I possesses a right cross-section that is circular and thus presents an outside surface that is cylindrical, however the right cross-section could be arbitrary or polygonal.

The porous substrate 2 is arranged to contain internally a single flow network 3 for the fluid medium for treatment flowing between an inlet 4 and an outlet 5. In the example shown, the inlet 4 is situated at one end of the porous substrate 2 and the outlet 5 at the other end of the porous substrate 2. The porous substrate 2 includes empty spaces or passages 3 for forming flow circuits for the fluid medium for treatment. The porous substrate 2 is arranged to include over its entire periphery a perimeter wall $2_1$ surrounding the empty spaces or passages. The perimeter wall $2_1$, which is defined by the outside surface 22 of the porous substrate 2, extends in continuous manner between the inlet 4 and the outlet 5.

Starting from its continuous perimeter wall 6, the porous substrate 2 includes a three-dimensional arrangement of structures that are connected to one another so as to leave between them empty spaces 3 for passing the fluid medium to create a flow network comprising a series of flow circuits R1, R2, . . . , RK for the fluid medium, which circuits are interconnected between the inlet 4 and the outlet 5 of the porous substrate.

As explained, the three-dimensional structures form an integral portion of the single-piece porous substrate, i.e. they result from the very shape given to the porous substrate and are not in any way separate fitted elements. The assembly forms a porous single block without any bonding, nor any interfaces, nor any joints of any kind. There is identity and continuity of porous material and texture between the three-dimensional structures and the perimeter wall $2_1$. Thus, the three-dimensional structures are mechanically and chemically solid and of the same strength as the perimeter wall $2_1$.

In the embodiment shown in FIGS. 9 to 9I, the empty spaces 3 form a single network R1 comprising a series of flow circuits $R1_1$, $R1_2$, . . . , that are interconnected between the inlet 4 and the outlet 5 of the porous substrate. In this example, the flow circuits are made by empty passages or spaces 3 in the form of seven peripheral channels a to g arranged around a circumference of the porous substrate, and a central channel h arranged at the center of the porous substrate, together with communication or interconnection passages 9 between the channels.

The channels a to h are made in the example shown, parallel to one another over the entire length of the porous substrate. Between the inlet 4 and the section B-B, the channels a to h are independent of one another. At the section B-B, the channels a to h are interconnected in the manner shown in FIG. 9B. More precisely, empty spaces or interconnections 9 are created firstly between neighboring pairs of adjacent peripheral channels, namely b-c, d-e, and f-g, and secondly between the central channel h and the peripheral channel that is not communicating with another peripheral channel, namely the channel a in the example shown. These empty spaces or interconnections 9 that remain as a result of the arrangement of the three-dimensional structures constitute communication passages between the channels, these interconnections 9 in the example shown extending transversely relative to the channels.

In the example shown, this arrangement of three-dimensional structures and of interconnections is repeated at different sections of the porous substrate at a regular pitch, while permutating the interconnections 9 in circular manner between the channels. Thus, at a section C-C of the porous substrate following the section B-B in question in the flow direction of the fluid medium for treatment (FIG. 9C), the channels a to h are interconnected with one another in pairs by creating empty spaces or interconnections 9 between the channels a-g, b-h, c-d, and e-g. Likewise, at the level of the section D-D of the porous substrate following the section C-C in question in the flow direction of the fluid medium for treatment (FIG. 9D), the channels a to h are interconnected with empty spaces or interconnections 9 being created between the channels a-b, c-h, d-e, and f-g.

In the example shown, the channels a to h are interconnected between the inlet and the outlet seven times by the interconnections 9 so that the fluid medium for treatment entering via the inlet 4 can flow in each of the channels to the outlet 5. The channels a to h and the interconnections 9 together form a series of mutually interconnected circuits R1, R2, . . . , RK.

Naturally, provision may be made to make a network in the porous substrate with a number of flow circuits different from that described and with interconnections different from those selected. Similarly, it may be advantageous to make a plurality of networks of flow circuits for the fluid medium that are mutually interconnected in the porous substrate, with the circuits of any one network being independent of the circuits of the other network. For example, the separator element 1 may include a first network of mutually interconnected circuits formed by the channels a, h, e, and d that are connected to one another, with various sections via communication passages 9, a second network of mutually interconnected circuits formed by the channels b and c connected to each other with at least one and in general manner with a plurality of different sections via communication passages 9, and a third network of mutually interconnected circuits formed by the channels f and g connected to each other, with at least one and more generally with a plurality of different sections by communication passages 9. These circuits of each of these three networks are independent from one another, i.e. they do not communicate with one another.

Naturally, a network may include a greater or smaller number of mutually interconnected flow circuits that are interconnected via interconnections 9 repeated at a pitch that may be regular or irregular. Likewise, the flow circuits may present shapes and dimensions that are very diverse. In the embodiment shown in FIGS. 9 to 9I, the mutually interconnected flow circuits comprise channels a to g of triangular section, a central channel h of circular section, and interconnections 9 of circular section. It is clear that the sections of the channels and of the interconnections 9 may be different from the sections shown merely by way of illustration.

It follows from the above description that the tangential flow separator element 1 presents a novel shape for the flow network for the fluid medium that enables the hydraulic diameters of the flow circuits to vary progressively or sequentially. This novel shape for the flow network for the fluid medium also makes it possible to implement radial and/or longitudinal interruptions in the travel direction of the fluid medium in order to increase the performance of the separator elements.

In the context of the invention, the porous substrate or indeed the tangential flow separator element as a whole is fabricated by way of example using an additive technique, such as that described by way of example in patent application FR 3 006 606.

The invention is not limited to the examples described and shown since various modifications can be made thereto without going beyond its ambit.

The invention claimed is:

1. A separator element for separating a fluid medium for treatment into a filtrate and a retentate, said separator element comprising:
   a porous rigid single-piece substrate made out of a single porous material;
   a peripheral wall extending continuously between an inlet at one end of the single-piece substrate and an outlet at another end of the single-piece substrate;
   at least a first flow network extending from the inlet to the outlet, and defining an open structure consisting of empty spaces in the substrate defined by a surface of the substrate covered by a separator layer and corresponding to zones of the substrate that do not include porous material;
   the separator layer being deposited on at least one surface of the substrate in contact with the empty spaces;
   wherein the at least first flow network comprises at least two interconnected flow circuits for the fluid medium for treatment between the inlet and the outlet of the porous rigid single-piece substrate; and
   wherein the at least two interconnected flow circuits of the at least first flow network communicate with each other via crossings or interconnections, so that the fluid medium for treatment encounters:
   at least one bifurcation, or at least one separation, causing the fluid medium to split into a plurality of portions which follow different paths, and/or
   at least one junction at which the fluid medium for treatment from different paths is united.

2. The separator element according to claim 1, wherein the empty spaces for passing the fluid medium are arranged in the porous rigid single-piece substrate so as to create within the porous rigid single-piece substrate at least a second flow network for the fluid medium for treatment comprising one or more flow circuits for the fluid medium between the inlet and the outlet of the porous rigid single-piece substrate.

3. The separator element according to claim 1, wherein at least one empty space for recovering filtrate is arranged in the porous rigid single-piece substrate and opens out through the perimeter wall of the porous rigid single-piece substrate.

4. The separator element according to claim 1, wherein the open structure is limited by a single continuous surface between the inlet and the outlet of the porous rigid single-piece substrate, being in contact throughout with the fluid medium and without presenting blind space, the open structure defining three-dimensional structures within a space demarcated by the perimeter wall.

5. The separator element according to claim 4, wherein a material constituting the three-dimensional structures present is identical, and presents a porous texture that is constant within the space demarcated by the perimeter wall.

6. The separator element according to claim 1, wherein the open structure defines three-dimensional structures with geometrical configurations that are non-repetitive.

7. The separator element according to claim 1, wherein the open structure defines three-dimensional structures formed by repeating at least one pattern inscribed in a volume unit of the porous rigid single-piece substrate forming a mesh, inside which, a morphologically predefined space is left empty for passing the flow of the fluid for treatment, said repetition taking place, firstly, by perfect or partial juxtaposition of the pattern(s) in at least one dimension of a three-dimensional space, and, secondly, in such a manner as to obtain flow continuity for the fluid medium between the empty spaces of the volume unit and porous material continuity for discharging the filtrate.

8. The separator element according to claim 7, wherein the open structure defines three-dimensional structures formed by repeating at least one pattern without varying either the shape or the dimensions of the pattern.

9. The separator element according to claim 7, wherein the open structure defines three-dimensional structures formed by repeating at least one pattern of dimensions that vary gradually in isomorphic manner in at least one direction, and/or of morphology that varies gradually in isometric manner in at least one direction.

10. The separator element according to claim 7, wherein the at least one pattern and the mesh that is associated therewith present one or more of the symmetries from the following list:
   central symmetry;
   orthogonal symmetry relative to a straight line;

mirror symmetry relative to a plane;
rotational symmetry; and
symmetry by similarity.

11. The separator element according to claim 8, wherein the repetition of the pattern(s) presents symmetry relative to the external symmetry of the porous rigid single-piece substrate.

12. The separator element according to claim 1, wherein the porous rigid single-piece substrate is made of a material that is organic or inorganic.

13. The separator element according to claim 4, wherein the at least one separator layer is continuously deposited on the walls of the three-dimensional structures, each separator layer of the at least one separator layer being a ceramic selected from the group consisting of oxides, nitrides, carbides, and other ceramic materials, and mixtures thereof.

14. The separator element according to claim 4, wherein the at least one separator layer is continuously deposited on the walls of the three-dimensional structures, each separator layer of the at least one separator layer being constituted by a polymer adapted to the intended separation, and deposited from a collodion of the polymer.

15. The separator element according to claim 1, wherein the porous rigid single-piece substrate presents a mean pore diameter lying in the range 1 µm to 100 µm.

16. The separator element according to claim 2, wherein the flow circuits of the at least second flow network are interconnected.

17. The separator element according to claim 13, wherein the ceramic is selected from the group consisting of titanium oxides, alumina, zirconia, a mixture of titanium oxides, alumina, and zirconia, titanium nitride, aluminum nitride, boron nitride, silicon carbide, and titanium carbide.

18. The separator element according to claim 13, wherein the selected ceramic is mixed with another ceramic material.

19. The separator element according to claim 1, wherein the open structure consists of empty spaces defined by a single continuous surface between the inlet and the outlet of the porous rigid single-piece substrate.

20. A separator element for separating a fluid medium for treatment into a filtrate and a retentate, said separator element comprising:
   a porous rigid single-piece substrate made out of a single porous material;
   a peripheral wall extending continuously between an inlet at one end of the single-piece substrate and an outlet at another end of the single-piece substrate;
   at least a first flow network extending from the inlet to the outlet, and defining an open structure consisting of empty spaces in the substrate defined by the surface of the substrate covered by a separator layer and corresponding to zones of the substrate that do not include porous material;
   the separator layer being deposited on at least one surface of the substrate in contact with the empty spaces;
   wherein the open structure defines three-dimensional structures with geometrical configurations that are non-repetitive,
   wherein the at least first flow network comprises at least two interconnected flow circuits for the fluid medium for treatment between the inlet and the outlet of the porous rigid single-piece substrate, and
   wherein the at least two interconnected flow circuits of the at least first flow network communicate with each other via crossings or interconnections, so that the fluid medium for treatment encounters:
   at least one bifurcation, or at least one separation, causing the fluid medium to split into a plurality of portions which follow different paths, and/or
   at least one junction at which the fluid medium for treatment from different paths is united.

* * * * *